United States Patent Office 3,681,087
Patented Aug. 1, 1972

3,681,087
CHEWING GUM COMPOSITION
Theodore R. Johnson, Jr., Weston, Mass., assignor to Meditron, Inc., Wayland, Mass.
No Drawing. Filed Apr. 15, 1970, Ser. No. 28,980
Int. Cl. A23g 3/00, 3/30
U.S. Cl. 99—135
8 Claims

ABSTRACT OF THE DISCLOSURE

A chewing gum composition comprising a chewing gum base and stable miraculin in a coating and/or admixed with the base. The composition enhances and preserves the refreshing taste of the gum for long periods without the need for sugar or artificial sweeteners to improve taste.

---

This invention relates to a novel chewing gum composition containing miraculin.

*Synsepalum dulcificum* Daniell, Sapotaceae is a plant indigenous to West-Central Africa which bears a red ellipsoid fruit commonly known as "miracle fruit." The fruit has a palatable pulp and skin and contains a large seed. It is characterized by a pleasant taste and by the unique property, well-recognized for over 200 years, of modifying the sweet and sour tastes in an unusual manner. It has been found that a component in the fruit depresses the sour taste and accentuates the sweet taste of any normally sour food eaten within a short period after first contacting the tongue with the pulp of fresh miracle fruit, thus causing the normally sour food to taste pleasantly sweet. By exposing the taste receptors on the tongue to miracle fruit, any sour tasting food can be made to taste sweet without the addition of sugar or artifiicial sweeteners. For example, fresh lemon can be made to taste pleasantly sweet by first eating a miracle fruit berry. The taste-modifying principle in the miracle fruit berry, commonly known as "miraculin," binds itself to the taste receptors thus altering the sour taste in foods eaten after the miracle fruit.

It has been determined that miraculin component is a glycoprotein having a molecular weight of about 44,000. A wide variety of approaches have been explored in attempts to isolate the active component in miracle fruit for subsequent use as a taste modifying material. These attempts have met only limited success since the form of the product obtained by these methods is less effective than the natural fruit and was found to be highly unstable at normal room temperatures under normal atmospheric conditions. This instability necessitated either very quick use after isolation or storage at very low temperatures.

The prior art has regarded miraculin as a very labile material accounting for the observed unstability of concentrates maintained at normal room temperatures. While some degree of success has been attained in improving stability of miraculin-containing material in the order of about a week or so, it has been found that stability could not be achieved when maintained in powder form at room temperatures. Alternatively, the miraculin-containing materail was dissolved in specific solvents maintained at specific pH conditions. These solutions had to the refrigerated to be preserved, and even then this material was not as effective as the natural fruit.

A novel powered form of the miraculin glycoprotein obtained from miracle fruit found to be stable for long periods of time of a year or more at normal room conditions and its methods of preparation is disclosed in co-pending application Ser. No. 28,981 filed concurrently herewith in the names of Robert J. Harvey and J. Richard Fennell entitled "Taste Modifying Composition and Method of Preparation."

In accordance with the process of the invention disclosed in the above-identified application, a stable miraculin-rich composition is obtained by comminuating depitted ripe miracle fruit containing miraculin and then separating the vaporous and liquid components including acids and enzymatic components of the ripe fruit that degrade miraculin from the miraculin-rich material. The liquid and vaporous components are separated by dehydration and the enzymatic components are separated by any means that effects separation on the basis of density.

To minimize miraculin loss after picking, the whole fruit can be frozen to very low temperatures to await processing or the pulp and skin can be processed immediately after picking to obtain the concentrated miraculin. Comminuation of the fruit serves to fracture the cell walls and thereby expose substantially all of the miraculin and facilitate subsequent processing. Dehydration can be effected in any convenient manner wherein low temperatures can be obtained including lyophilization, foam separation, spray, drying or similar dehydration processes and can precede or follow the separation step based on density. It is preferred to separate the high density miraculin from the low density enzyme-rich material following dehydration because of the increased efficiencies obatined thereby. If the miraculin is not separated from the material containing the enzyme, the product is unstable and will be degraded quickly at normal room conditions so that it loses its taste-modifying effect. The miraculin-rich material, substantially free of the degrading enzyme and/or acids, has a substantially higher density than the material containing the enzyme. Therefore, the separation of the miraculin, that may contain some cellulosic material, from the material containing the enzyme is effected by processes that separate materials on a density basis. To facilitate this separation, the mixed pulp and miraculin is preliminarily comminuted and screened to obtain uniformly small particle size.

The preferred process of the invention disclosed in the above-identified co-pending application is based upon the discovery that degradation of miraculin in the fruit is initiated immediately after the ripe fruit is picked, and that degradation of the active principle in its natural environment is accelerated by increased temperature and by contact with air. Thus, it is preferred to process the ripe miracle fruit as quickly as possible, at as low temperature as possible, and in as non-oxidizing atmosphere, to obtain a high yield of miraculin. Preferably, the picked fruit is washed in water and then depitted at about 1 to 4° C. The fruit can be stored in a frozen state to await processing or can be processed immediately to obtain the active principle. When stored, temepratures of about −40° C. or less are employed to arrest degradation since it has been found that degradation of the active principle in the frozen fruit occurs even when stored at temperatures of about −15° C. Since it is difficult to remove the pit or seed from the frozen berry, it is preferred to depit the berry prior to frozen storage. The depitted berry, regardless of whether it has been stored previously or whether it is processed directly after having been picked, is comminuted in a frozen state either alone or together with Dry Ice or ice formed from pyrogen-free distilled water. When the berry is processed immediately after having been picked, the pulp and skin obtained from the depitting step are directed into a container placed in a low temperature bath which itself may contain crushed Dry Ice. The pulp and skin are then comminuted at low temperatures such as by blending, grinding or ball-milling with ball-milling in a shell freezer being preferred.

The separation of the miraculin-rich material from the enzyme-rich material is based upon the fact that the active principle is considerably more dense than the enzyme-rich material in the order of about 10 times as dense. Thus, the mixture of inerts and active material described above can be separated by any convenient density separation method including settling from a suspension of the mixture in liquid, the use of fluidizing bed technique, or through the use of cyclone type centrifuge. Some separation of miraculin-rich material from enzyme-rich material can be effected prior to dehydration by placing the comminuted pulp in settling pans at a temperature of 1–4° C. until the highest density material has settled in the bottom. The settling is complete in a short period of about 20 minutes with the miraculin-rich material forming the lowest layer which is then separated. The material is then frozen to below about −40° C. and dehydrated. The preferred separation method is conducted after dehydration and utilizes a cyclone type centrifuge for dry powder following dehydration described in the examples. The miraculin-rich material has a density in excess of 1 g./cc. while the enzyme-rich cellulosic material has a density of less than about 0.5 g./cc. since the high density material is white and the low density material is brown the separate layers can be easily and quickly identified on the basis of color. To obtain the desired product stability, enzyme-rich material concentration should be as low as possible with removal in the order of about 95% having been found to be adequate.

The product disclosed in the copending application is a stable white powder comprising the miraculin glycoprotein either alone or admixed with material inert with respect to the characteristic of suppressing sour taste but excluding vaporous and liquid components of the fruit and enzymes that degrade the miraculin present in the pulp and skin of miracle fruit. The product exhibits remarkable stability in powdered form at normal room conditions. This is indeed surprising in view of the prior art which regarded the active principle in miracle fruit to be highly unstable and thermo-labile such that it was thought necessary to maintain powdered concentrates in a frozen condition or in a dry atmosphere or to refrigerate solutions of the active principle obtained by the prior art processes to retain the desired stability over reasonably long periods of time.

The stability of the powdered product obtained by the processes disclosed in the above-copending application facilitates formation of unit dosage forms therefrom. However, while the product was recognized as being useful to render sour tasting foods sweet and in another aspect to mask bitter taste in certain food, it was believed that this represented the extent of the activity of the stable miraculin.

The present invention is based upon the discovery that miraculin incorporated in or coated on a chewing gum composition has the effect of preserving the refreshing taste of the gum for long periods. Furthermore, the addition of miraculin to chewing gum compositions substantially reduces or eliminates the amount of sugar or artificial sweeteners now used to render the gum pleasant tasting for long periods.

The present invention provides a novel chewing gum composition comprising a chewing gum base and powdered miraculin. The chewing gum composition can include additional components usually incorporated in chewing gums including flavorings.

Apparently the miraculin in the gum composition not only enhances the taste of the gum components and/or flavoring therein but itself effecting a pleasant taste that is maintained for an hour or more. This contrasts with presently available chewing gums that lose their taste usually within about a few minutes of chewing. The gums of this invention also provide a means for quickly and effectively applying miraculin to the taste receptors when it is desired to improve the sweetness of foods to be ingested subsequently. They are particularly effective in improving the taste of sour fruit flavoring normally incorporated in chewing gums.

The miraculin either can be admixed with the chewing gum base or can be coated around a core comprising the chewing gum base. It is preferred that the miraculin be incorporated in a coating rather than the core since less miraculin is required to obtain the desired taste improvement and prolongation. The coating can be formed by any convenient method such as by dusting or by forming a glazed coating.

Suitable gum bases include unmodified potianac gum, Gulta Katian, chicle, rubber latex base disclosed in U.S. Pat. No. 1,930, 436 and jelutong base disclosed in U.S. Pat. No. 2,137,746 or mixtures thereof or these bases modified with paraffin waxes.

The miraculin is employed in amounts of about 0.1 to 50 mg. per unit dosage form such as a gum stick or gum ball. Additional miraculin can be used but no substantial advantage as to taste modifying effect is obtained thereby. Generally, a mint or fruit flavoring is added to the gum base and sugar can be added if desired.

In another aspect of this invention, the gum composition can include either a non-toxic alkaline material or acid material. Alkaline materials neutralize the mouth acids and increase the effectiveness of the miraculin in that degradation normally caused by mouth acids is reduced or eliminated. This reduces the amount of miraculin needed to obtain the desired results. Suitable non-toxic alkaline materials include magnesium carbonate, sodium bicarbonate, aluminum, trisilicate, aluminum hydroxide complexes such as aluminum hydroxide-magnesium carbonate co-dried gels, aluminum hydroxide or the like in amounts between 10 and 500 milligrams. The alkaline material when employed, is added to or forms the coating so that is neutralizes the mouth acids prior to substantial contact of miraculin with the mouth acids. Sugar also can be added to the alkaline material to improve its taste.

Acids incorporated in the gum composition enhance the taste thereof in that they taste sweet after contact of the taste receptors with miraculin. Thus, when acids are employed, the miraculin is incorporated in an outer layer separate from the acid so that the miraculin contacts the tongue prior to the acid. The miraculin contacts the tongue prior to the acid thereby reducing miraculin degradation while obataining the desired taste-modifying effect. Suitable non-toxic acids include carboxylic acids such as citric, malic, ascorbic, formic, acetic, tartaric or inorganic acids in lower concentrations or mixtures thereof. The acids are added in amounts to obtain an effective molarity of between .001 M and 0.1 M. By "effective molarity" is meant the amount of acid in the gum, which when dissolved, effects the same sweetening affect of an aqueous acid solution having the molarity set forth.

The acid and alkaline materials can be incorporated together in the gum composition with the alkaline material in an outer layer, the acid material in an inner layer and the miraculin in an intermediate layer or admixed with the alkaline material.

The following example illustrates the present invention and is not intended to limit the same.

EXAMPLE

A lemon flavored gum is prepared from the following formulation:

| | Gms. |
|---|---|
| Chicle | 130.00 |
| Paraffin wax | 37.30 |
| Tolu balsam | 6.20 |
| Peruvian Balsam | 3.10 |
| Glucose | 150.00 |
| Citric acid | 55.00 |
| Corn syrup | 50.00 |
| Salt | 5.00 |
| Water | 170.00 |
| Yellow artificial color (Bates) | 1.00 |
| Artificial lemon flavor (IFF) | 10.00 |

The chicle is soaked in water and mixed hot with the paraffin and balsam. The remaining ingredients are kneaded into the chicle until a homogeneous mixture is obtained. The gum then is molded into sticks. The sticks are dusted with stable miraculin powder obtained by the process of the above-cited copending patent application so that each stick is coated with about 20 to 30 mg. miraculin.

What is claimed is:

1. A chewing gum compoistion comprising a chewing gum base and powdered material rich in the taste modifying principle of the ripe fruit of *Synsepalum dulcificum* Daniell for suppressing sour taste and enhancing sweet and salt taste which material is substantially free of the components of the ripe fruit that degrade the taste modifying principle, the amount of said material being sufficient to enhance and preserve the refreshing taste of the gum without the need for sugar or artificial sweetness to improve taste.

2. A unit dosage form of the composition of claim 1 containing about 0.1 mg. to 50 mg. miraculin.

3. The composition of claim 1 wherein the miraculin is coated on the chewing gum base.

4. A unit dosage form of the composition of claim 1 including a non-toxic acid in a layer more remote than the miraculin from the surface of the unit dosage form.

5. The unit dosage form of claim 4 having a coating comprising a non-toxic alkaline material.

6. The unit dosage form of claim 5 wherein the miraculin is admixed with the alkaline material.

7. A unit dosage form of the composition of claim 1 having a coating comprising a non-toxic alkaline material.

8. The unit dosage form of claim 4 which is substantially free of normally sweet-tasting materials.

References Cited

FOREIGN PATENTS 56,660            Luxembourg.

OTHER REFERENCES

Dalziel, The Useful Plants of West Tropical Africa (an appendix to the Flora of West Tropical Africa), The Crown Agent for the Colonies, Westminister, London, SW. 1, 1948.

Inglett et al. Tropical Plants With Unusual Taste Properties, Economic Botany, 1967, pp. 326–331.

Kurihara, K., et al., "Mechanism of the Action of Taste-Modifying Protein," Nature vol. 222, June 1969, pp. 1176–1179.

Brouwer, J. N., et al., "Miraculin, the Sweetness-Inducing Protein From Miracle Fruit," Nature, vol. 220, October 1968, pp. 373–376.

Kurihara et al., "Taste-Modifying Protein From Miracle Fruit, Science, vol. 161, September 1968, pp. 1241–1243.

RAYMOND N. JONES, Primary Examiner

J. M. HUNTER, Assistant Examiner